United States Patent [19]

Kerr

[11] Patent Number: 4,478,379

[45] Date of Patent: Oct. 23, 1984

[54] UNMANNED REMOTELY PILOTED AIRCRAFT

[75] Inventor: John P. Kerr, Hudson Heights, Canada

[73] Assignee: Canadair Limited, Montreal, Canada

[21] Appl. No.: 545,609

[22] Filed: Oct. 27, 1983

Related U.S. Application Data

[63] Continuation of Ser. No. 267,865, May 28, 1981, abandoned.

[51] Int. Cl.³ .............................................. B64C 27/10
[52] U.S. Cl. .............................. 244/17.11; 244/17.23; 244/120; 416/204 R
[58] Field of Search ................. 244/17.11, 17.17, 17.23, 244/115, 116, 120, 138 A; 416/114, 115, 248, 204 R, 205

[56] References Cited

U.S. PATENT DOCUMENTS

| | | | |
|---|---|---|---|
| 2,847,173 | 8/1958 | McCarty, Jr. | 244/17.11 |
| 3,357,656 | 12/1967 | Peterson | 416/115 |
| 3,801,050 | 4/1974 | Stone | 244/115 |
| 4,123,018 | 10/1978 | Montaigu | 244/17.23 |
| 4,163,535 | 8/1979 | Austin | 244/17.23 |
| 4,302,155 | 11/1981 | Grimes | 416/248 |

FOREIGN PATENT DOCUMENTS

| | | | |
|---|---|---|---|
| 1082009 | 12/1954 | France | 244/17.11 |
| 198504 | 9/1965 | Sweden | 244/17.17 |

OTHER PUBLICATIONS

*Jane's All the World Aircraft*, editor J. Taylor, 1977-1978, p. 644, "Canadair CL-227."

Primary Examiner—Galen L. Barefoot
Attorney, Agent, or Firm—J. Ernest Kenney; A. Lebrun

[57] ABSTRACT

An unmanned aircraft of the remotely piloted type that is characterized by its configuration and outline using rigid counter rotating propellers, positioned substantially at the height of its center of mass or slightly below to allow producing a sufficiently large control moment to use a tether line for landing the aircraft and to allow using two substantially spheroidal surfaces at the top and bottom respectively rather than a single one relatively larger and more detectable surface as when the propellers are at the top.

6 Claims, 4 Drawing Figures

UNMANNED REMOTELY PILOTED AIRCRAFT

This application is a continuation of application Ser. No. 267,865, filed may 28, 1981 now abandoned.

FIELD OF THE INVENTION

This invention relates to an unmanned aircraft more particularly of the remotely piloted type.

DESCRIPTION OF THE PRIOR ART

There have been conceived and/or produced many unmanned aircraft of the above type. So far, the efforts have produced workable units in particular concerning the flight and stability controls. In the known unmanned aircraft of the above type that have been conceived so far, the propulsion is achieved by helicopter like propellers positioned at the top of the aircraft and using non-rigid propellers to achieve the desired flight and attitute controls and in particular using differential collective pitch control. Such propellers produce a relatively small control output resulting in an undesirable limitation against strong moments on the aircraft such as when a tether line is attached to hold it captive.

The unmanned aircraft of the above type are more commonly conceived for warfare use on the battlefield and for that purpose they must be as difficult as possible to detect by the enemy; visually, by radar, or by infra red.

SUMMARY OF THE INVENTION

It is a general object of the present invention to provide an unmanned remotely piloted aircraft that includes active flight and stability controls producing relatively large moments sufficient to counter the large moment produced on the aircraft by a tether line holding it captive.

It is another general object of the present invention to provide an unmanned remotely piloted aircraft that is made with an appropriate configuration and outline of its major components one relative to another to minimize the possibility of its detection such as by the enemy.

It is a more specific object of the present invention to provide an unmanned remotely piloted aircraft combination that is made with counter rotating propellers positioned substantially at the height of the center of mass of the combination and to thus achieve the above mentioned general objects of the present invention.

It is a still more specific object of the present invention to provide an unmanned remotely piloted aircraft combination that uses rigid counter rotating propellers positioned substantially at the height of the center of mass of the combination to allow larger control moments which thus cope with large unbalance moments such as produced by a tether line holding the aircraft captive.

It is a still more specific object of the present invention to provide an unmanned remotely piloted aircraft that allows to have a configuration with counter rotating propellers positioned at intermediate height between the top and bottom thereof and also with two generally spheroidal surfaces above and below the propellers for minimum exposure to detection by radar reflection and the like due to the inherent dispersive nature of such surfaces.

BRIEF DESCRIPTION OF THE DRAWINGS

The above and other objects and advantages of the present invention will be better understood with reference to the following detailed description of a preferred embodiment thereof which is illustrated, by way of example, in the accompanying drawings; in which.

Figure 1:
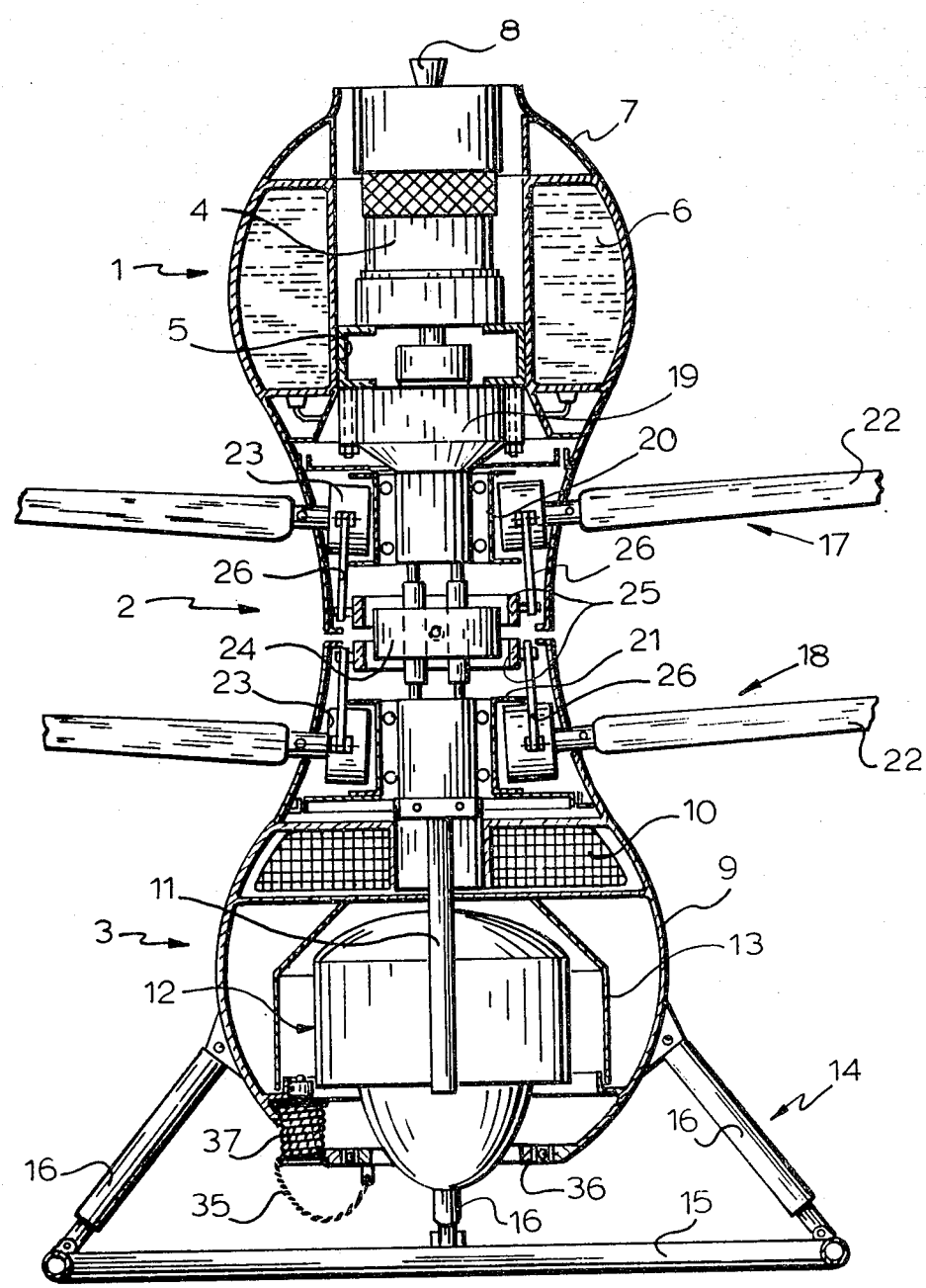
FIG. 1 is a cross-sectional view in elevation of an unmanned aircraft according to the present invention.
Figure 2:
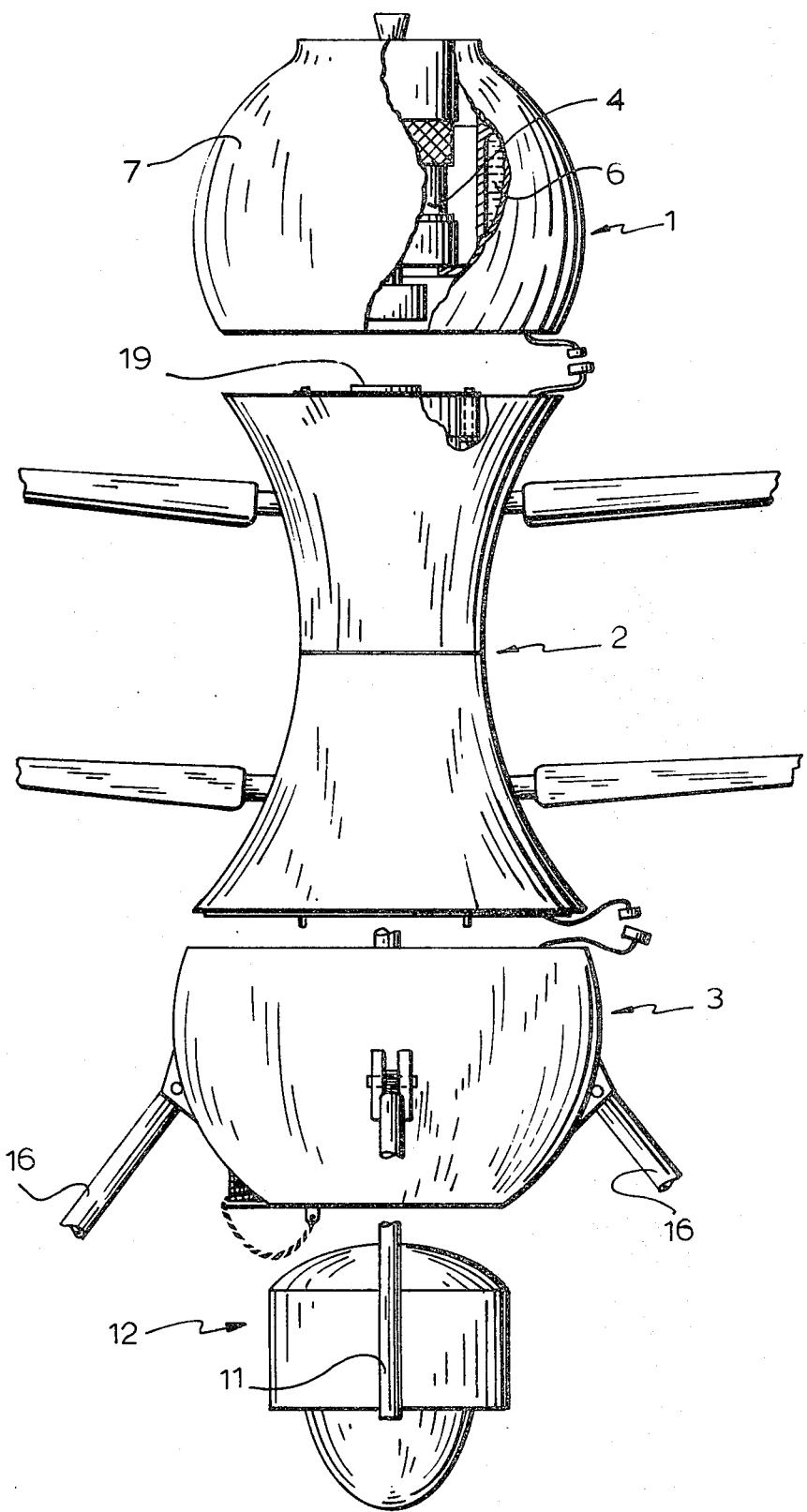
FIG. 2 is an exploded elevation view of the same aircraft to illustrate its modular concept.

The illustrated remotely piloted unmanned aircraft comprises a body that is symmetrical about a vertical axis. That aircraft body comprises vertically superposed sections including an uppermost section 1, an intermediate section 2, and a lowermost section 3. Each of these sections constitutes a separable module constructed and arranged to be readily disconnected for maintenance or replacement.

The uppermost module or section 1 includes a rotary internal combustion engine or turbine 4 fixedly mounted on a supporting bracket 5. A generally annular or doughnut shaped gas tank 6 is positioned around the engine 4 and is thus used to shield the hot parts of the engine against infra red detection. The outside of the body is provided with a housing or shell 7 having a generally spheroidal outline to be the least susceptible to radar detection. This is so due to the inherent high dispersive nature of spheroidal surfaces to radar waves or reflections. The exhaust outlet 8 for the engine 4 is positioned at the top of the uppermost section and thus also of the whole body of the aircraft and is upwardly directed along the aircraft vertical axis to be concealed against infra red detection from the ground, down below.

The lowermost section or module 3 is also provided with a housing or shell 9 of generally spheroidal outline in which is housed the necessary flight control units, disgrammatically shown at 10. The control units do not form part of the present invention and therefore will not be described in the present patent application. Suspension brackets 11 are fixedly secured at their upper end, inside the lowermost body section. These suspension brackets are constructed and arranged to releasably support a payload 12 that is pivotally suspended by the brackets, in any well known manner. The payload 12 in this case constitutes a data acquisition package for remote control of the vehicle and for surveillance of ground sites such as for enemy surveillance on a battlefield, for traffic surveillance, or for other civil uses. A shielding hood 13 is provided over and around the data acquisition payload 12.

A landing gear 14 is attached to the exterior of the lowermost section 3 and includes a landing ring 15. The latter is connected to the lowermost body section 3 by means of three legs 16 each in the form of a shock absorbing strut that is pivotally connected at its opposite ends to the lowermost body section and to the landing ring respectively.

Figure 3:
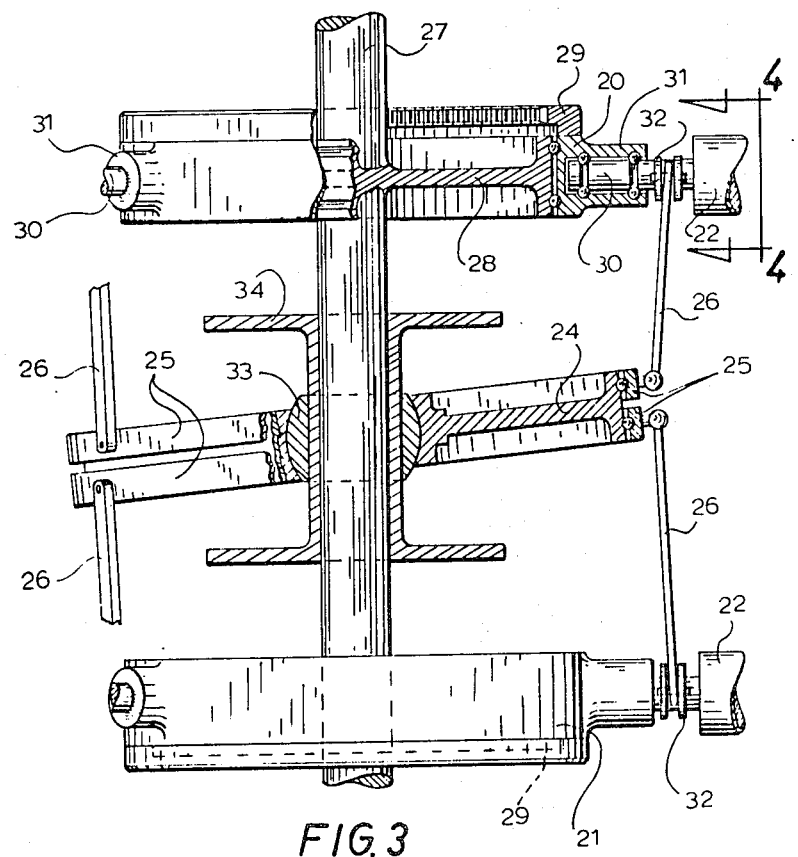
FIGS. 3 and 4 are elevation views partly in cross section of the propellers, blades and swashplate interconnection shown in a larger scale and in a slightly different embodiment than in FIG. 1.

The intermediate body section 2 includes a pair of counterrotating propellers 17 and 18 and the associated control mechanisms shown in greater details in FIG. 3. A gearbox 19 is centrally mounted by suitable means at the top of the intermediate body section, and through appropriate shaft and gearing arrangement, not shown, it drives the top propeller hub 20 in one direction and the bottom propeller hub 21 in the opposite direction. Each propeller 17, 18 includes 3 blades 22 having each a hub portion 23, as shown in FIG. 1 rotatively mounted in its corresponding propeller hub 20 or 21.

The collective and cyclic pitch control mechanisms illustrated in FIGS. 1 and 3 are essentially the same with only some secondary differences. The embodiment of FIG. 1 will first be described in details. As shown in FIG. 1, the collective and cyclic pitch control mechanism is connected to the blades 22 to selectively vary the pitch angle of each blade around its blade pitch control axis defined by the corresponding blade hub 23. A swash plate 24 is mounted between the two counterrotating propellers and is tiltable by any appropriate means, not shown in two orthogonal directions corresponding to the selected pitch an roll directions of the aircraft. A pair of rings 25 are rotably attached to the swashplate to rotate coaxially around it in well known manner. A blade pitch actuator arm 26 is pivotally connected, for each blade 22, at one end to the corresponding blade hub 23 and at the other end to the corresponding ring 25 to vary the blade pitch in relation with bodily tilting of the swashplate and rings for cyclic pitch control or in relation with bodily up or down displacement of the swashplate and rings for collective pitch control, all as is well known in the art.

Figure 4:
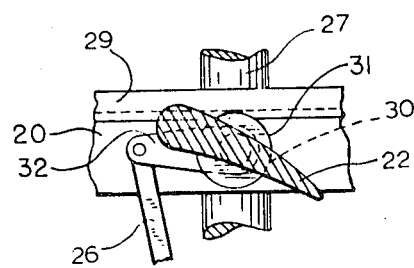

The collective and cyclic pitch control mechanism illustrated in FIGS. 3 and 4 represents a slightly different embodiment compared to the embodiment in FIG. 1 and more specifically defines how the propeller hubs 20, 21 and the swashplate 25 are mounted in the vehicle or aircraft body. The latter is provided with a fixed central shaft 27 having fixedly secured thereto spoked wheels 28 around which are rotatably mounted the propeller hubs 20 and 21 respectively. Each of the propeller hub 20, 21 carries a ring gear 29 that is driven by the engine 4 through appropriate pinion and shaft drive, not shown. In this embodiment, each blade 22 has a hub portion 30 rotatably engaged in a radial projection 31 of the corresponding propeller hub. A lever 32 is fixed to each blade hub 30, as in the embodiment of FIG. 1, for connection of the blade pitch actuation arm 26 to it;

In this embodiment of FIG. 3, the swashplate 24 is shown tiltably mounted on a ball joint 33 fixed to a spool shape support 34 that is slidable along the shaft 27. Thus the vertical sliding of the support 34 produces the same displacement of the swashplate 24 and collective control of the blade pitch angles.

Thus, with the payload 12 of known mass installed in the aircraft, the distribution of mass along the aircraft vertical axis is arranged to result in the aircraft center of mass being located substantially in the horizontal plane of the propeller hubs.

A tether line 35 is attached to the lower end of the aircraft more particularly by one of its ends attached to a ring 36 that is mounted on bal bearings to freely rotate relative to the body of aircraft. The tether line is coiled on a spool 37 that is releasably carried by the aircraft during a flight. Any remote controlled releasable latch system is provided to releasably hold the spool onboard during flight. When desired for landing, the spool 37 is remotely unlatched or released to allow it to fall to the ground where the tether line is then pulled on to safely and guidably land the aircraft independently of adverse weather conditions and excessively accurate control performance.

What is claimed is:

1. An unmanned, remotely piloted aircraft comprising:
    a main body symmetrical about a vertical axis comprising three separable, vertically stacked body sections;
    the uppermost one of said body sections including means to enclose and support a propulsive engine;
    a propulsive engine contained within and supported by said uppermost body section;
    a fuel tank in said uppermost body section arranged to laterally surround at least a major portion of said engine;
    the intermediate one of said body sections including means to support a gear box connectable with said engine, a pair of vertically arranged counterrotating propeller hubs and propeller blades secured thereto, and pitch control means for the propeller blades;
    a centrally located gear box enclosed within said intermediate one of said body sections and supported by said means to enclose and support said gear box;
    a pair of vertically spaced counterrotating propeller hubs connected together for being jointly driven by said engine through said gear box enclosed within and supported by the intermediate body section;
    variable pitch propeller blades secured to said hub through a rigid connection arranged to permit the pitch of the propellers to be changed;
    pitch control means enclosed by and supported by said intermediate body section connected to the propeller blades and arranged to control the pitch of all the propeller blades simultaneously in a collective and/or differential sense;
    the lowermost one of said body sections including means for containing and supporting a payload of known mass;
    a payload of known mass contained within and supported by said lowermost body section;
    said propeller hubs located substantially in the horizontal plane including the center of mass of the aircraft with said payload.

2. An aircraft according to claim 1, wherein said uppermost and lowermost body sections are connected to the intermediate body section by quick disconnect means, and the connection between the uppermost and intermediate sections is through said gearbox.

3. The aircraft according to claim 1 or 2, said engine including an exhaust conduit, said exhaust conduit disposed substantially centrally along the vertical axis of the aircraft and arranged to discharge exhaust gases generally vertically parallel to said axis.

4. An aircraft according to claim 3, including a landing gear secured to the lowermost body section.

5. An aircraft according to claim 3, including a spool for a coil of tether line, the spool releasably secured to the aircraft, with one end of the tether line secured to the body and the other end connected to the spool.

6. The aircraft according to claim 5, said tether line connected to the body by a rotatable ring rotatable about the body vertical axis.

* * * * *